Sept. 1, 1970  A. M. COOK  3,526,063
INTEGRAL MOUNTING MEANS AND REINFORCEMENT FOR GRINDING WHEELS
Original Filed March 8, 1965  2 Sheets-Sheet 1

INVENTOR.
ARNOLD M. COOK
BY
ATTORNEY

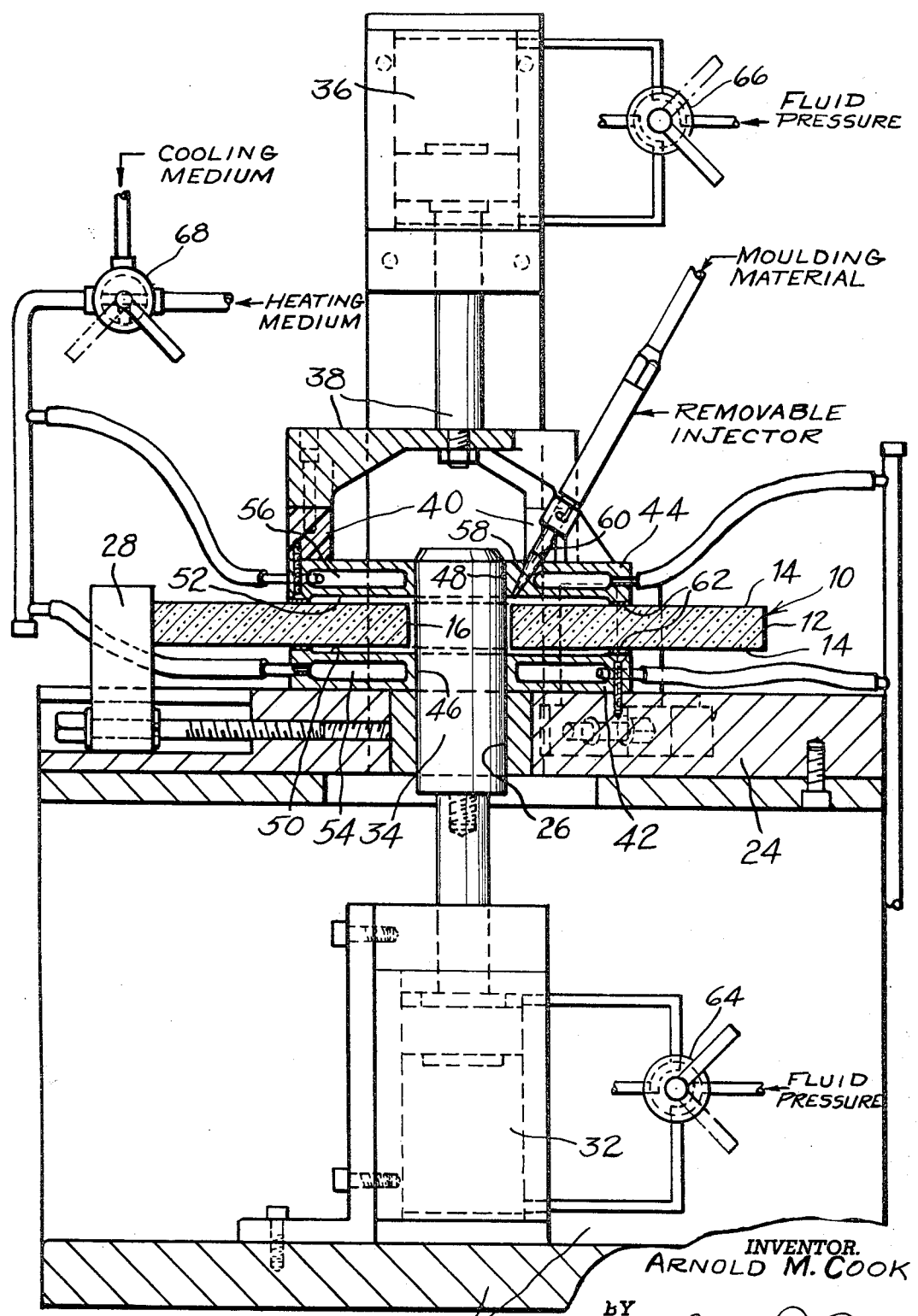

United States Patent Office 3,526,063
Patented Sept. 1, 1970

3,526,063
INTEGRAL MOUNTING MEANS AND REINFORCEMENT FOR GRINDING WHEELS
Arnold M. Cook, Holden, Mass., assignor to Norton Company, Worcester, Mass., a corporation of Massachusetts
Original application Mar. 8, 1965, Ser. No. 437,919, now Patent No. 3,354,510, dated Nov. 28, 1967. Divided and this application June 28, 1967, Ser. No. 672,659
Int. Cl. B24b 7/00
U.S. Cl. 51—206                       2 Claims

ABSTRACT OF THE DISCLOSURE

A central annular mounting and drive engaging portion of a porous grinding wheel has integrally molded bearing surfaces within a center arbor hole and side flange bearing surfaces with or without identifying indicia thereon of a cured resinous material injected into and reinforcing the central annular portion of the wheel. The cured resinous material fills and extends through pores in the central annular portion to form the bearing surfaces on opposite sides of the wheel and within the center hole.

---

This invention relates to improvements in grinding wheels and is concerned principally with improving the mounting portion of the wheel comprising the bearing surface of the center hole, an annular portion of the wheel around the hole, and side surfaces of the wheel coextensive therewith. The instant invention being one previously disclosed in and divided out of an original copending application Ser. No. 437,919, filed Mar. 8, 1965 now Pat. No. 3,354,510.

It is customary to provide a metal bushing within the center hole of the wheel and to employ blotter-like discs at the side faces of the wheel respectively to support the driving arbor for rotation of the wheel and to transmit the rotational forces from the arbor through the driving flanges to the wheel without slippage and/or distortion of the wheel. The blotter-like discs are sometimes adhered to the side faces of the wheel and sometimes furnished loose and in either case are usually printed or stenciled to identify the manufacturer, kind and use of the wheel. Unfortunately, it is virtually impossible to obtain a mechanical interlock between a metal bushing and the center hole of the wheel which will not ultimately become loose, and the blotter-like discs, whether attached or furnished loose, are so easily scuffed and damaged by handling that they fail to distribute the driving and clamping pressures satisfactorily and cause uncertainty and confusion due to partial or complete obliteration of the identifying information.

The principal objects of this invention are to provide a grinding wheel with integrated bearing surfaces at the center hole and the side faces marginally thereof adapted to hold the driving arbor without breakdown and to transmit the driving forces through the clamping flanges without slippage or distortion of the wheel; to provide bearing surfaces which will withstand shear and compressive forces; to provide side surface facings suitable for receiving permanent identifying information; and to provide reinforcement of an annular portion of the wheel surrounding the center hole. Other objects are to provide a method of treating a grinding wheel to obtain a wheel embodying the foregoing structure and apparatus for carrying out the method.

As herein illustrated, the invention concerns grinding wheels, comprised of abrasive material, which are mounted on an arbor between clamping flanges; characterized in that an annular portion of the wheel, concentric with the center hole, is impregnated with a resinous material which is rigid at operating temperatures, and that the interior surface of the center hole and the surfaces of the annular portion at the side face are faced with a continuous homogeneous coating of resinous material of sufficient depth to submerge the grain structure at the surfaces, and to provide flat surfaces at the side faces of the wheel adapted to embody identifying indicia.

In accordance with one method of applying the resin to the center portion of the wheel, the wheel is placed on an arbor of smaller diameter than the wheel's center hole between mold plates containing annular recesses concentric with the center hole to form a mold cavity containing the interior surface of the hole and annular portions of the side faces coextensive with the recesses, a low viscosity resin is injected into the mold cavity under sufficient pressure to impregnate the center portion of the wheel and to fill the annular space at the center about the arbor and the annular spaces between the recessed portions of the plates and the side faces of the wheel and heat is applied through the mold plates to effect setting.

The apparatus comprises an arbor of smaller diameter than the center hole of the wheel, a pair of mold plates mountable on the arbor with a grinding wheel between them, and means for holding the wheel with its center hole concentric with the axis of the arbor. The mold plates have annular recesses in the faces next to the side faces of the wheel and one of the plates contains an injection opening through which resin may be forced into the recesses to impregnate an annular portion of the wheel surrounding the hole, substantially coextensive with the annular recesses in the mold plates, to fill the center hole about the arbor and to fill the spaces afforded by the recesses in the mold plates at the side faces of the wheel. There is means for holding the mold plates clamped against the side faces of the wheel during injection and setting of the plastic and means for heating the mold plates to expedite setting. The apparatus includes a table having a supporting surface containing a hole through it within which is situated the arbor, and a first pressure-operable motor is situated below the table and connected to the lower end of the arbor operable to raise and lower the arbor relative to the table. The surface of the table is adapted to support the mold plates with the wheel therebetween on the arbor, and the means for holding the wheel concentric with the arbor is a centering multiple jaw chuck on the table concentric with the axis of the center hole for engagement with the peripheral edge of the wheel. There is a second pressure-operable motor situated above the table operative to press the upper mold plate into engagement with the wheel and the wheel in turn against the lower mold plate resting on the table. The first pressure-operable motor is operative to extricate the arbor from the finished wheel by lowering it relative to the table.

The invention will now be described in greater detail with reference to the acompanying drawings wherein:

FIG. 3 is an elevation, partly in section, of apparatus for making the wheel as herein shown with the improved mounting portion.

Figure 2:
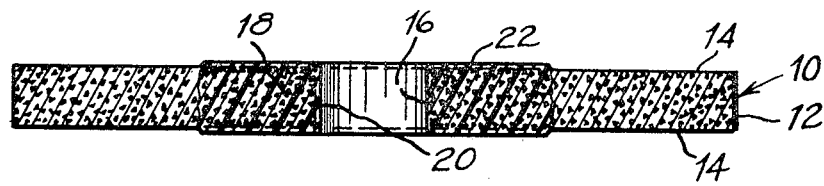
FIG. 2 is a diametrical section of the wheel.
Figure 1:
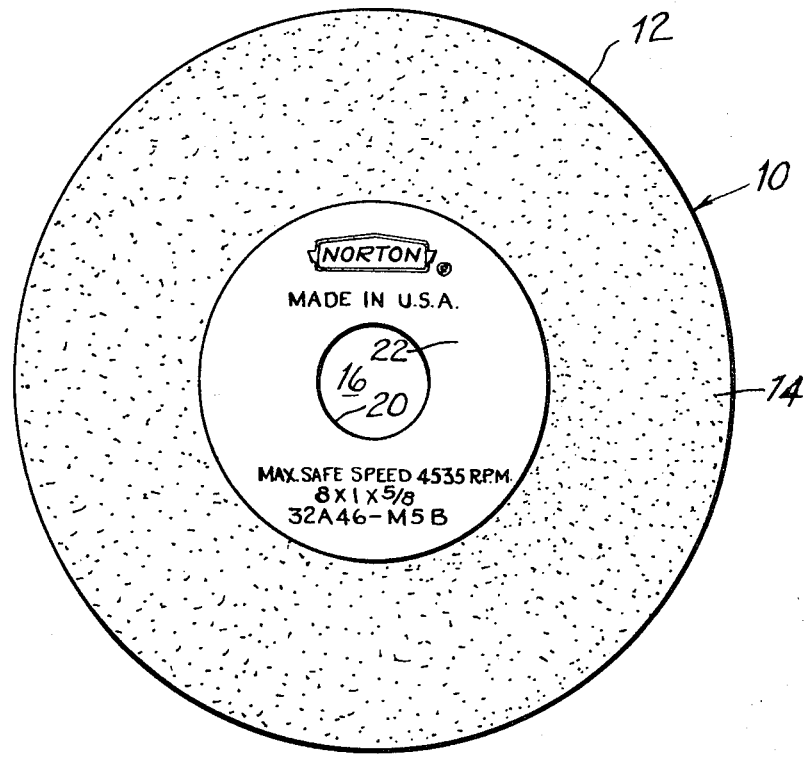
FIG. 1 is a plan view of a grinding wheel provided with the improved mounting portion.

Referring to the drawings (FIGS. 1 and 2), the grinding wheel 10 is of conventional configuration, being comprised of granular abrasive material bonded by a binder to provide a circular disc having a peripheral grinding surface 12, spaced parallel side faces 14—14 and a center mounting hole 16. In accordance with this invention, an annular portion 18 of the wheel, concentric with and adjacent to the center mounting hole 16, is impregnated with resin and the interior surface of the mounting hole 16 and annular surface portions of the side faces 14—14 at each face of the wheel, corresponding substantially in area to the annular impregnated portion 18, are coated with continuous homogeneous facing layers 20 and 22 of resin of such thickness as to submerge at least the grain structure of the wheel. The facing layers 20 and 22 provide tough, wear-resistant bearing surfaces for reception of the driving arbor and the clamping flange and may be in the order of $\frac{1}{16}$ of an inch thick depending upon the operating conditions to which the wheel is to be subjected. A low cost plastisol type of resin or equivalent material is used which forms a permanent bond with the wheel, is hard at operating temperatures, is tough, resistant to deterioration, has a high coefficient of friction, and may be embossed or imprinted.

Referring to FIG. 3, there is shown apparatus for treating the wheel comprising a chuck 24 containing a centrally located hole 26 and adjustable upstanding peripheral positioning jaws 28 concentric with the axis of the hole 26 adapted, by engagement with the edge of the wheel, to hold the wheel and its mounting hole 16 centered with respect to the hole 26. A base 30 supports the chuck 24 in a horizontal position and provides support for a fluid-pressure operable motor 32. The fluid-pressure operable motor 32 is secured to the base below the chuck 24 and supports the lower end of an arbor 34, with a portion projecting upwardly through the hole 26 in the table for vertical movement relative to the upper surface of the chuck. A second fluid-pressure operable motor 36 is supported above the table by suitable means and has a ram 38 protruding from its lower end to which there is fastened a plurality of spaced hold down shoes 40 concentric with the axis of the hole 26 and the arbor 34. A pair of removable mold plates 42 and 44 are provided which are fixed respectively to the chuck 24 and shoes 40 and contain, respectively, central holes 46 and 48 corresponding in diameter to the arbor 34 and which contain, respectively, in one surface annular recesses 50 and 52 which are concentric with the center holes therein and are about $\frac{3}{16}$ of an inch deep. The diameter of the arbor is enough smaller than the center hole in the wheel so that a clearance is afforded between the peripheral surface of the arbor and the inner surface of the hole of about the same thickness as the depth of the recesses in the mold plates.

The mold plates also contain, respectively, an internal chamber 54 and 56 through which a heating medium may be circulated or within which may be mounted a resistance heating element, and as shown, a cooling medium may be alternately circulated through the chamber to expedite the removal of the wheel. One of the plates, the upper one 44 as shown herein, contains an injection opening 58 extending from its outer face to its inner face so as to be in communication with the recess 52 at its inner face, and hence with the recess 50. A closely fitting injection nozzle 60 is shown inserted in and locked in the opening 58 with its small hole extending to the inner face of the recess. The nozzle 60 is removed after a predetermined amount of resinous material is injected—that is, when the amount reaches the inner face of the recess 52. Sealing gaskets 62 made of a heat resisting flexible material such as silicone rubber are fixed to each of the mold plates beyond the recess to prevent escape of the resinous material.

In carrying out the method, as herein illustrated, with the foregoing apparatus, the arbor 34 is elevated above the mold plate 42 by operating a valve 64 to supply fluid pressure to the lower end of the motor 32, the mold plate 42 having been initially fixed on the chuck over the arbor, the wheel 10 is placed over the arbor and pushed down onto the mold plate 42, the jaws 28 serving, by engagement with the edge of the wheel, to center the wheel with respect to the axis of the arbor, and the mold plate 44 is then lowered over the arbor 34 and pressed down against the upper side face of the wheel by operating valve 66 to supply pressurized fluid to the motor 36 so as to press the wheel betwen the mold plates, the lower one 42 of which rests on and is sustained by the chuck 24. The arbor 34 and mold plates 42 and 44 collectively form a mold cavity within which are confined the inner surface of the center hole of the wheel and annular portions of the side faces of the wheel corresponding in diameter to the recesses in the mold plates. The diameter of the arbor and the depth of the recesses is such as to permit injection of liquid resin into the cavity to form a continuous homogeneous coating coextensive with the surfaces confined within the cavity. A low viscosity resin is employed to assist in rapid penetration of the wheel at a relatively low pressure. To prevent escape of resin, gaskets 62 interposed between the mold plates and the side faces of the wheel outwardly of the recesses. Gaskets are of a yieldable nature to take up for the roughness of the side faces of the wheel. If necessary when wheel structure is not sufficiently porous vent holes may be provided at suitable places to permit escape of air and hence complete filling of the mold cavity.

Having assembled the wheel between the mold plates and applied pressure to seal the mold cavity, a low viscosity resinous material of the desired kind is forced under pressure through the injection nozzle 60 locked in the passage 58 so as to impregnate that portion of the wheel included between the mold plates and to fill the annular space situated between the inner surface of the hole in the wheel and the outer surface of the arbor and the spaces situated between the bottoms of the recesses in the mold plates and the side faces of the wheel concentric therewith. When the resinous material reaches the desired level of the inner face of recess 52 the supply of resin is cut off and the nozzle removed from the mold plate 44. Suitable float means or sight glasses may be provided to help in determining the said desired level.

The resin employed herein is preferably a plastisol which is a dispersion of polyvinyl chloride resin in a suitable liquid plasticizer but other suitable materials may be used instead. At room temperature plastisols may vary in consistency from water thin to heavy paste and at about 350° F. fusion takes place, resulting in a tough, solid mass. Pressure is not required in the transformation from liquid to solid and hence the only pressure required is to hold the mold parts sufficiently tightly engaged with the faces of the wheel to prevent escape of the plastisol before transformation from liquid to solid commences to take place. Desirably a rapid heat-setting plastisol is employed which will form a good bond with the wheel; which will release from the usually highly polished mold parts; and which will preferably have sufficient durometer hardness of between 70 and 90 measured on the Shore A scale and stability, after curing, to resist ageing, distortion, and the forces imposed on it during use.

Preferably heat is supplied to the mold plates, as mentioned above, by operating a valve 68 to supply a high temperature fluid such as steam to the chambers 54 and 67 in the plates. After setting is completed the valve 68 is operated to pass a cooling medium through the mold plates to hasten the releasing of the product from the mold plates.

The mold plate 44 is raised away from the grinding wheel by operating valve 66 to supply pressure to the lower end of the cylinder 36, and the arbor 34 is withdrawn from the wheel by operating valve 64 to supply pressure fluid to the upper end of the cylinder 32. Usually the grinding wheel can then be removed from the top of the mold plate 42 in the chuck 24, but if it rises with the mold plate 44 due to flash material, the wheel can be removed by rotating it slightly to break the flash at the end of the passage 58. Molds are then cleared if necessary, and the process repeated.

The surfaces of the mold recesses are highly polished and smooth and are preferably embossed or inscribed with identifying information so as to provide permanent marking on the surfaces of the plastic facing. If desired, such marking may be omitted during the molding operation and the information applied to the surfaces of the plastic facing, after the wheel is finished in any suitable fashion, which will afford permanence.

It should be understood that the present disclosure is for the purpose of illustration only and that this invention includes all modifications and equivalents which fall within the scope of the appended claims.

I claim:

1. A grinding wheel having: side faces, a center mounting hole, a molded arbor bearing surface in the center mounting hole, a reinforced annular portion substantially concentric with and adjacent the center hole, molded side flange bearing surfaces on and coextensive with the reinforced annular portion extending from the molded arbor bearing surface and beyond the side faces, the reinforced annular portion being impregnated with a substantially hard, stable resinous material resistant to aging and distortion under stresses imposed by operating conditions and extending to the arbor bearing surface and to the side flange bearing surfaces, the arbor bearing surface and the side flange bearing surfaces being integrally molded together and homogenous with the resinous material impregnated in the annular reinforced portion and permanently bonded to the wheel whereby good bearing surfaces for mounting the grinding wheel and reinforcement thereof are simultaneously provided by an integral molded homogenously cured mass of resinous material permanently bonded to the wheel.

2. A grinding wheel according to claim 1 wherein the side flange bearing surfaces has permanent identifying indicia molded therein.

References Cited

UNITED STATES PATENTS

| | | | |
|---|---|---|---|
| 845,511 | 2/1907 | Brown et al. | 51—207 X |
| 2,004,630 | 6/1935 | Krug | 51—206 |
| 2,033,263 | 3/1936 | Tone | 51—293 |
| 2,259,345 | 10/1941 | Kuzmick et al. | 51—206 |
| 2,862,806 | 12/1958 | Nestor | 51—295 |
| 3,250,045 | 5/1966 | Caserta | 51—209 |
| 3,256,645 | 6/1966 | Holdash | 51—206 |

OTHELL M. SIMPSON, Primary Examiner